INVENTOR.
RAYMOND J. MILLER
BY O. H. Fowler
ATTORNEY.

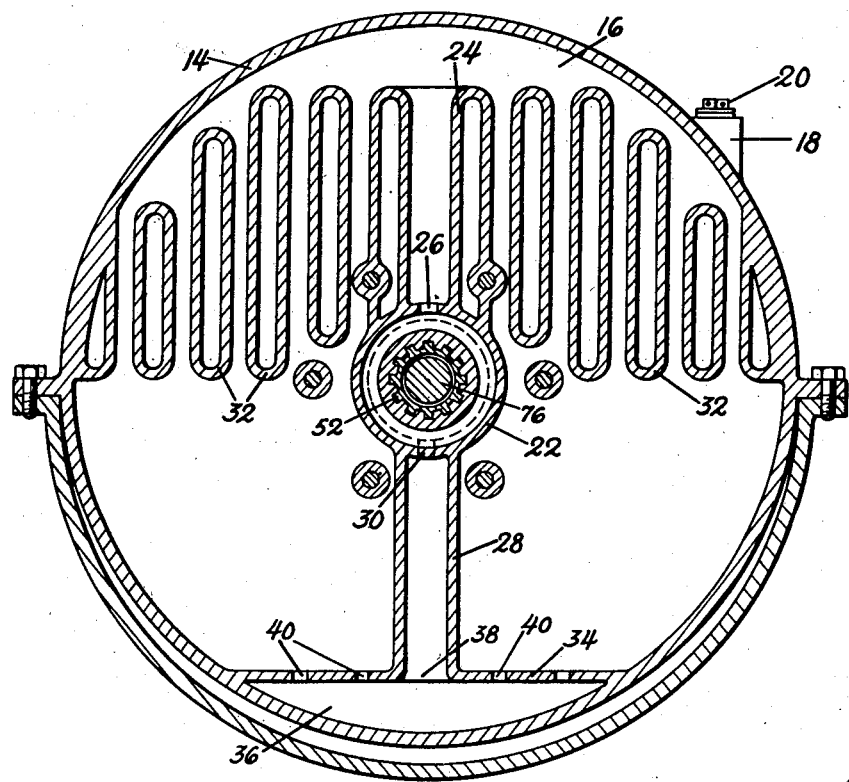
Fig. 2.
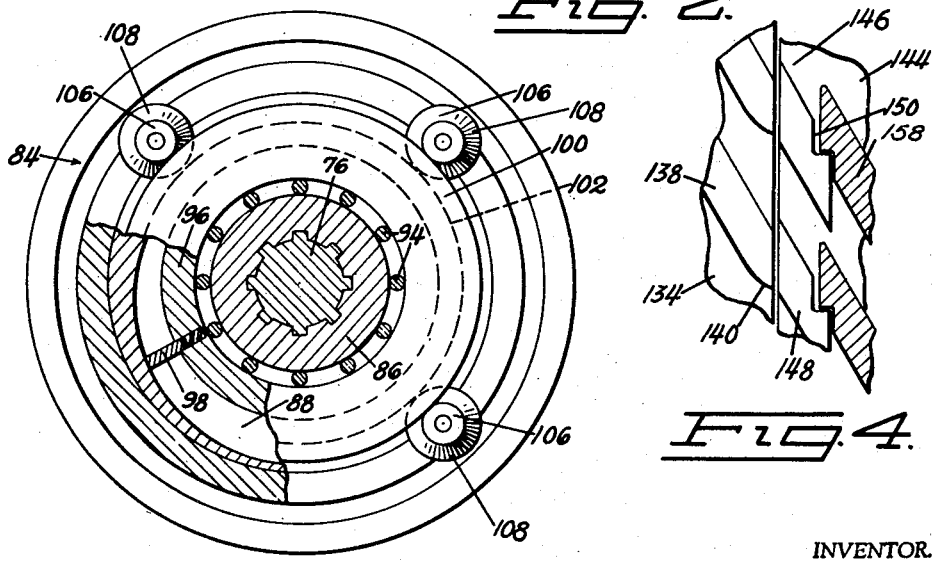
Fig. 3.
Fig. 4.
INVENTOR.
RAYMOND J. MILLER
BY
ATTORNEY Patented Nov. 28, 1944

2,363,983

UNITED STATES PATENT OFFICE 2,363,983

TURBOTRANSMISSION

Raymond J. Miller, Detroit, Mich., assignor to Hydraulic Brake Company, Detroit, Mich., a corporation of California Application April 28, 1941, Serial No. 390,810

6 Claims. (Cl. 60—54)

This invention relates to transmissions, and more particularly to fluid transmissions for motor vehicles.

The invention contemplates a fluid transmission including an impeller, a turbine driven thereby, and means for effectively reducing frictional resistance between the impeller and the turbine when great differential in the speed of the impeller and turbine occurs.

An object of the invention is to provide a fluid transmission including an impeller, a turbine driven by the impeller, and a differential pump operative to automatically deliver a large volume of fluid to the unit when the turbine is substantially static so as to disperse heat and also to reduce frictional resistance between the impeller and the turbine.

Another object of the invention is to provide a fluid transmission for a motor vehicle including an impeller, a turbine driven thereby, and a differential pump for delivery of varying volumes of fluid to the impeller, the rotor of the pump having reversed direction of rotation from that of the impeller and turbine.

Other objects and advantages of the invention will appear from the following description taken in connection with the drawings forming a part of this specification and in which—

Fig. 2 is a sectional view substantially on line 2—2, Fig. 1;

Fig. 3 is a sectional view substantially on line 3—3, Fig. 1; and

Fig. 4 is a fragmentary view of the feed screw.

Figure 1:
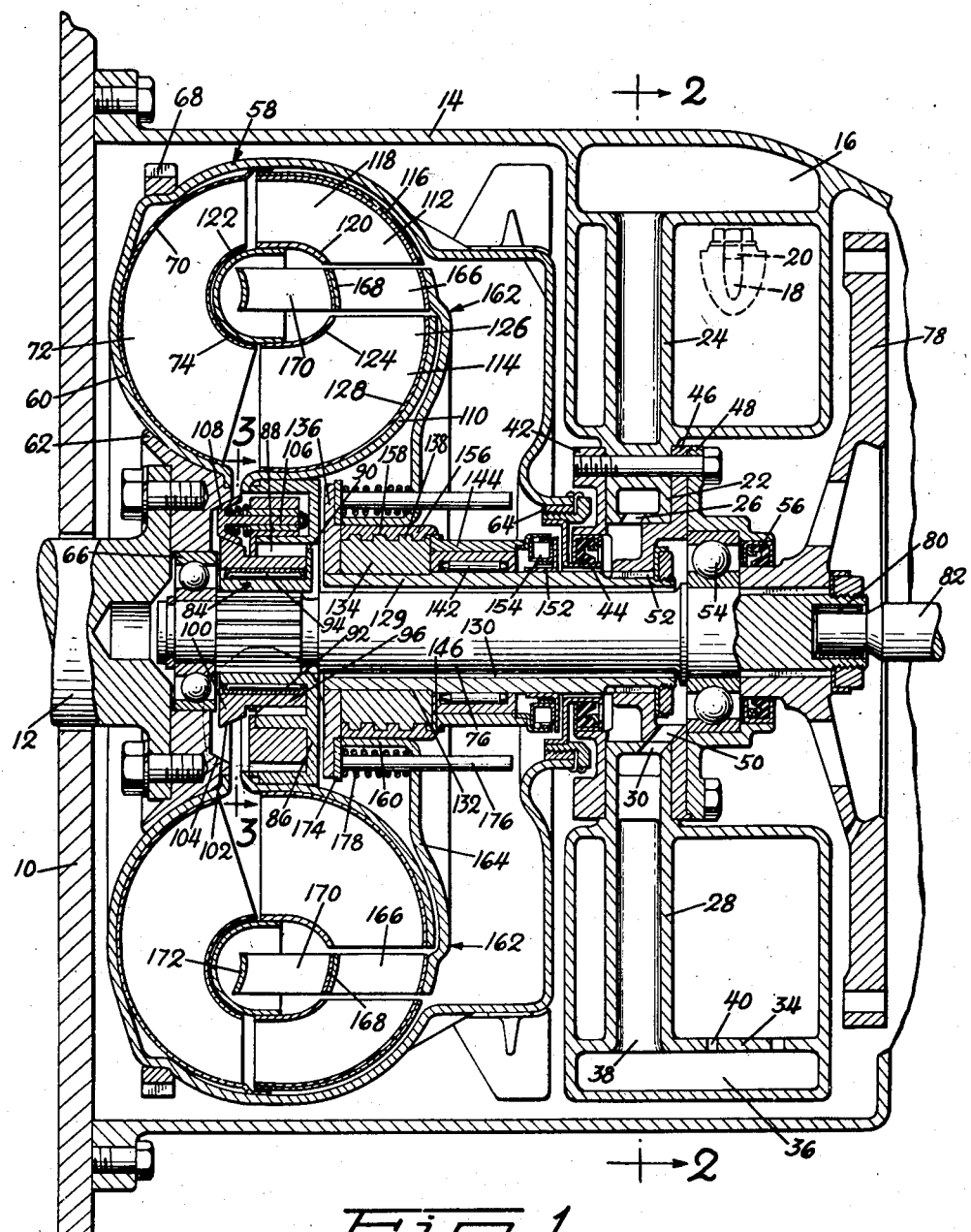
Fig. 1 is a vertical sectional view of a fluid torque converter embodying the invention.

Referring to the drawings for more specific details of the invention, 10 represents the crank case of an internal combustion engine, and 12 the crank shaft of the engine. The crank case 10 has secured thereto a bell housing 14 enclosing a reservoir 16 provided with a filling opening 18, in the wall of the bell housing, normally closed by a plug 20.

The reservoir is preferably annular, and on its inner perimeter is a hollow flange 22 communicating with the reservoir. A tube 24 formed integral with the perimeter of the flange 22 extends upwardly therefrom, and an inlet port 26 in the perimeter of the flange communicates with the tube, and, correspondingly, a tube 28 formed integral with the perimeter of the flange 22 extends downwardly therefrom, and an outlet port 30 in the perimeter of the flange communicates with the tube 28.

Air ducts 32 are arranged in parallel relation to one another on each side of the tube 24, and a diaphragm 34, providing a sump 36 has an opening 38 communicating with the tube 28, and also a plurality of apertures 40 providing communications between the reservoir and the sump.

Heated fluid enters through the intake port 26, passes upwardly through the tube 24, thence spreads and passes downwardly between the air ducts 32, where it is cooled, into that portion of the reservoir below the air ducts, thence through the apertures 40 in the diaphragm into the sump 36, from where it is drawn through the tube 28 and outlet port 30 by pumping means, to be hereinafter described.

A ring 42 secured to one side of the flange 22 supports a fluid seal 44, and a pair of oppositely disposed rings 46 and 48 are secured to the other side of the flange 22. The ring 46 has an opening 50 therethrough registering with the outlet port 30 of the reservoir, and this ring also has internal splines 52, and the ring 48 supports a bearing 54 and a fluid seal 56.

A fluid torque converter, indicated generally at 58, includes a housing 60 having a hub 62 suitably secured to the crank shaft 12, and a hub 64 in oppositely disposed relation to the hub 62 embraced by the fluid seal 44. The hub 62 has a concentric bore, and fitted in this bore is a bearing 66. A ring gear 68 is suitably mounted on the housing 60 for connecting a starter, not shown, and mounted on the inner wall of the housing is a shroud 70 having arranged thereon a plurality of impeller blades 72 supporting an inner shroud 74.

A center shaft 76 mounted for rotation on the bearings 54 and 66 in axial alignment with the crank shaft 12, has splined thereto a clutch member 78, and the hub of this clutch member is embraced by the fluid seal 56 for inhibiting seepage of fluid from the housing 60. The center shaft 76 has in one end thereof a concentric bore, and fitted in this bore is a bearing 80 supporting a driven shaft 82, and the driven shaft carries a clutch member, not shown, for cooperation with the clutch member 78, and a differential fluid pump 84 is mounted on the other end of the shaft adjacent the hub 62.

As shown, the pump 84 includes a housing 86 splined to the center shaft 76. The housing provides a chamber 88 eccentrically disposed with relation to the center shaft 76, and this chamber has an inlet port 90 and a discharge port 92; the latter communicating with the housing 60 of the torque converter. A needle bearing 94 on the hub of the housing 86 supports a rotor 96 having a plurality of blades 98 in wiping engagement with the wall of the pump chamber. The blades may be of any preferred type. The rotor also has a flange 100 provided with a beveled face 102 oppositely disposed and in concentric relation to a circumferential beveled face 104 on the hub 62, and a plurality of spaced spring-pressed plungers 106 rotatably carried by the housing 86 of the pump have conical heads 108 cooperating with the beveled faces 102 and 104 to yieldingly couple the rotor 96 of the pump to the hub of the impeller.

A turbine associated with the impeller includes a web 110 supported on and fixedly secured to the pump housing for rotation therewith. The web supports a two-stage turbine 112 and 114 within the housing 60 in oppositely disposed relation to the impeller and provides in conjunction therewith a fluid circuit. As shown, the two-stage turbine includes an outer shroud section 116 having secured thereto a plurality of vanes 118 constituting the first stage of the turbine. The vanes 118 support an inner shroud section 120, fixedly secured to another inner shroud section 122 adjacent the inner shroud section 74, and the inner shroud section 122 is fixedly secured to an inner shroud section 124 supported on a plurality of vanes 126 fixedly secured to an outer shroud section 128 mounted on the web 110 and constituting the second stage of the turbine.

A sleeve 129 slipped over the center shaft 76 has on one end external splines received by the splines 52 on the ring 46, and the sleeve is supported by the ring 146 in spaced relation to the center shaft to provide in conjunction therewith an annular channel 130, constituting a communication between the outlet port 30 of the reservoir and the inlet port 90 of the pump.

Fluid is discharged from the pump into the housing 60, passes through the fluid circuit, where it becomes heated, thence from the housing, through the hub 64, and intake port 26, into the reservoir. The other end of the sleeve 129 has a reduced portion 132, and fitted on this reduced portion is a heavy sleeve 134 and a ring 136. The sleeve 134 and ring 136 are fixedly secured to one another and also to the sleeve 129. The sleeve 134 has external threads 138 provided with rounded approaches 140. A needle bearing 142 on the sleeve 129 supports for slight rotation a sleeve 144 having a peripheral flange 146 provided with threads 148 of the same pitch as the threads 138, and the approach ends of the threads 148 have dogs 150. A collar 152 is suitably secured on the sleeve 129 and a brake 154 interposed between the collar and the sleeve 144 yieldingly resists movement of the sleeve in both directions of rotation.

A carrier 156 adapted to travel on the sleeves 134 and 144 has internal threads 158 for cooperation with the threads 138 and 148 on the sleeves 134 and 144, respectively. The carrier has suitably secured thereto a sleeve 160 supporting a reaction member 162 including a web 164 having thereon a plurality of vanes 166 adapted to move into and out of the fluid circuit between the first and second stages of the turbine, and the vanes 166 support a shroud 168 having thereon a plurality of index vanes 170 supporting a shroud 172.

A ring 174 supported on the ring 136 has thereon spaced rods 176 extended through openings in the web 164 of the reaction member, and sleeved on these rods between the ring 174 and the reaction member are springs 178 of varied lengths for progressively resisting movement of the reaction member tending to move the vanes 166 into the fluid circuit.

In a normal operation, assuming that the unit is filled with fluid to its normal capacity, transmission of force from the power plant to the crank shaft results in driving the impeller and the pump. The housing 86 of the pump is keyed to the center shaft 76 and the rotor 96 of the pump is journaled in the chamber 88. The rotor has conventional spring-pressed blades 98 in wiping engagement with the wall of the chamber, and a flange 100 having a beveled face 102 concentrically disposed with relation to the beveled face 104 on the hub 62 secured to the crankshaft 12, while spring-pressed plungers 106 rotatably mounted on the housing have conical heads 108 interposed between the beveled faces 102 and 104. This provides for driving the rotor of the pump in reverse direction of rotation from that of the impeller and the center shaft supporting the pump housing, resulting in frictional resistance proportionate to the differential in speed of rotation of the driving shaft 12 and the center shaft 76. The pump draws fluid from the reservoir through the outlet port 30, the passage 50, the annular channel 130, through the inlet port 90 into the chamber 88, and discharges the fluid through the outlet 92 into the vortex chamber. The fluid is delivered to the impeller by the pump at a rate proportionate to the speed of rotation of the crank shaft. The impeller energizes the fluid, and the energy of the fluid is received on the vanes constituting the first stage 112 of the turbine, and on the vanes 166 of the reaction member 162, causing rotation of the turbine.

This rotation of the turbine results in driving the center shaft 76 and the driven shaft 82 clutched thereto. Upon rotation of the center shaft, the housing 86 of the pump is driven, and, accordingly, a smaller volume of fluid is delivered to the impeller because the differential in speed of the impeller and turbine now becomes less.

As the speed of rotation of the impeller increases, the energy of the fluid increases proportionately, and this increased energy of the fluid acting on the vanes 118 of the turbine causes increase in speed of the turbine. As this increased speed approaches that of the impeller, the angle of the fluid leaving the first stage of the turbine shifts from impinging on the faces of the reaction vanes 166 to impinge upon the backs of the vanes, causing the reaction member 162 to spiral on the threaded sleeve 134 out of the fluid circuit onto the sleeve 144, and as the reaction member retracts, the index vanes 170 carried thereby move in between the first and second stages of the turbine and direct the flow of fluid from the first stage 112 of the turbine to the second stage 114 thereof, and under this condition the transmission functions as a fluid coupling.

Upon decrease in difference of the speed of rotation of the impeller and the turbine, the volume of fluid delivered by the pump decreases proportionately. As an increased load is imposed on the turbine, the differential in speed increases, and the pump delivers an increased volume of fluid. Concomitantly therewith, the angle of discharge from the first stage of the turbine shifts because of demand of torque ratio, and impinges on the face of the index vanes 170, causing the reaction member to spiral into the fluid circuit.

Upon initial movement of the reaction member tending to spiral into the circuit, the threads 158 on the carrier of the reaction member disengage the dogs 150 and engage the threads 148 on the sleeve 144 and advance thereon to the approaches 140 on the threads 138. The approaches 140 serve to guide the threads 158 into engagement with the threads 138, and as the carrier advances on the threads 138 the reaction member 162 spirals into the fluid circuit against the progressively increasing resistance imposed by the springs 178.

It is obvious from the foregoing that the pump delivers fluid to the impeller at a rate proportionate to the speed differential between the impeller and the turbine, and that the maximum volume of fluid is delivered to the impeller when the turbine and the impeller are rotating at maximum differential speed, and, correspondingly, the minimum volume of fluid is delivered by the pump to the impeller when the turbine approaches the speed of the impeller. It is also obvious that the rotor of the pump rotates in reverse direction to that of the impeller and turbine, and, accordingly, imposes frictional resistance on the turbine proportionate to the differential in speed of rotation of the impeller and the turbine.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid transmission comprising an impeller, a turbine providing in conjunction therewith a fluid circuit, and a pump for delivery of fluid into the circuit including a rotor arranged coaxially with relation to the impeller and turbine and rotative in opposite direction from that of the impeller and turbine and a housing for the rotor carried by the turbine.

2. A fluid transmission comprising an impeller, a turbine providing in conjunction therewith a fluid circuit, and a pump having a rotor and a housing connected respectively to the impeller and turbine for delivery of fluid into the circuit at a rate decreasing as the differential in speed of rotation of the impeller and turbine decreases, the rotor and housing operative in reverse directions of rotation.

3. A fluid transmission comprising an impeller, a turbine providing in conjunction therewith a fluid circuit, and a pump having a rotor and a housing connected respectively to the impeller and the turbine for delivery of fluid into the circuit in volume decreasing proportionately to the decreased differential speed of rotation of the impeller in relation to the turbine, the rotor rotative in reverse direction to that of the housing so as to oppose the resistance presented by the turbine.

4. A fluid transmission comprising an impeller, a turbine providing in conjunction therewith a vortex chamber, a pump for delivery of fluid into the chamber having a housing fixedly secured to the turbine, and means connecting the rotor of the pump to the impeller to provide for reverse rotation between the rotor and the housing.

5. A fluid transmission comprising a primary means for energizing fluid and secondary means for receiving energy from the fluid providing in conjunction with one another a fluid power transmitting circuit, means for delivery of fluid into the circuit, an element of the delivery means connected to the secondary means and means connected to the secondary means for coupling another element of the delivery means to the primary means whereby the respective elements of the delivery means rotate reversely to one another so as to oppose resistance presented by the secondary means.

6. A fluid transmission comprising a primary means for energizing fluid and a secondary means receiving energy from the fluid providing in conjunction with one another a fluid power transmission circuit, and a rotary pump for delivery of fluid into the circuit having its rotor driven from the primary means in reverse direction to rotation of the primary means and its housing carried by the secondary means and functioning to change resistance to movement of the secondary means in proportion to the differential in speed of rotation of the primary and secondary means.

RAYMOND J. MILLER.